US012636653B2

(12) United States Patent
Park et al.

(10) Patent No.: US 12,636,653 B2
(45) Date of Patent: May 26, 2026

(54) APPARATUS AND METHOD FOR CHECKING NORMAL MOUNTING OF SLIDE TRAY

(71) Applicant: CURIOSIS CO., LTD, Seoul (KR)

(72) Inventors: Minseop Park, Seoul (KR); Hoyoung Yun, Seoul (KR); Dongyoub Baik, Seoul (KR); Beom Jun Lee, Seoul (KR)

(73) Assignee: CURIOSIS CO., LTD, Seoul (KR)

( * ) Notice: Subject to any disclaimer, the term of this patent is extended or adjusted under 35 U.S.C. 154(b) by 382 days.

(21) Appl. No.: 18/216,347

(22) Filed: Jun. 29, 2023

(65) Prior Publication Data

US 2024/0139748 A1 May 2, 2024

Related U.S. Application Data

(63) Continuation of application No. PCT/KR2023/007338, filed on May 30, 2023.

(30) Foreign Application Priority Data

Oct. 26, 2022 (KR) ........................ 10-2022-0138857

(51) Int. Cl.
*B01L 9/00* (2006.01)

(52) U.S. Cl.
CPC .................. *B01L 9/52* (2013.01); *B01L 9/56* (2019.08); *B01L 2300/025* (2013.01)

(58) Field of Classification Search
CPC ... B01L 9/52; B01L 2300/0822; G01N 1/312; G01N 1/36; G01N 2035/00039; G01N 2035/00138; G01N 35/00732
See application file for complete search history.

(56) References Cited

U.S. PATENT DOCUMENTS 10,302,665 B2 5/2019 Reinhardt
10,921,335 B2 2/2021 Newberg
2003/0012698 A1* 1/2003 Hirota .................. B01J 19/0046 422/63
2005/0186114 A1* 8/2005 Reinhardt ........ G01N 35/00029 422/65

(Continued)

FOREIGN PATENT DOCUMENTS

CA 2325583 A1 9/1999
CN 111279199 A 6/2020

(Continued)

OTHER PUBLICATIONS

Japanese Office Action for JP 2023-540499 issued Oct. 30, 2024.

*Primary Examiner* — Alexander P Gross
(74) *Attorney, Agent, or Firm* — Dinsmore & Shohl LLP; Yongsok Choi, Esq.

(57) ABSTRACT

A slide tray slot is provided. The slide tray slot includes a slot body; a light source generator provided on one inner surface of the slot body; a light source detection sensor capable of detecting a light source emitted from the light source generator; and a plurality of slide tray compartment parts arranged in a vertical stack between the light source generator and the light source detection sensor. The light source generator emits the light source in the direction of the vertical stack in which the plurality of slide tray compartment parts are arranged.

20 Claims, 18 Drawing Sheets

(56) References Cited

U.S. PATENT DOCUMENTS

| | | | | |
|---|---|---|---|---|
| 2006/0164611 | A1* | 7/2006 | Scampini | G01N 35/00029 353/103 |
| 2006/0180489 | A1* | 8/2006 | Guiney | G02B 21/34 206/456 |
| 2017/0363850 | A1* | 12/2017 | Quarre | G02B 21/34 |
| 2020/0011889 | A1* | 1/2020 | Toyoda | G06K 7/1417 |

FOREIGN PATENT DOCUMENTS

| | | | |
|---|---|---|---|
| JP | H10242095 | A | 9/1998 |
| JP | 2002-037380 | A | 2/2002 |
| JP | 2002-37380 | A | 2/2002 |
| JP | 2002507738 | A | 3/2002 |
| JP | 2002196010 | A | 7/2002 |
| JP | 454669682 | B2 | 11/2003 |
| JP | 2006308575 | A | 11/2006 |
| JP | 2007-123513 | A | 8/2010 |
| JP | 2012-017110 | A | 1/2012 |
| JP | 2019-046831 | A | 3/2019 |
| KR | 10-1230202 | B1 | 2/2013 |
| KR | 10-1538687 | B1 | 7/2015 |
| KR | 10-1718474 | B1 | 3/2017 |
| KR | 10-2298612 | B1 | 9/2021 |

* cited by examiner

[FIG. 1]
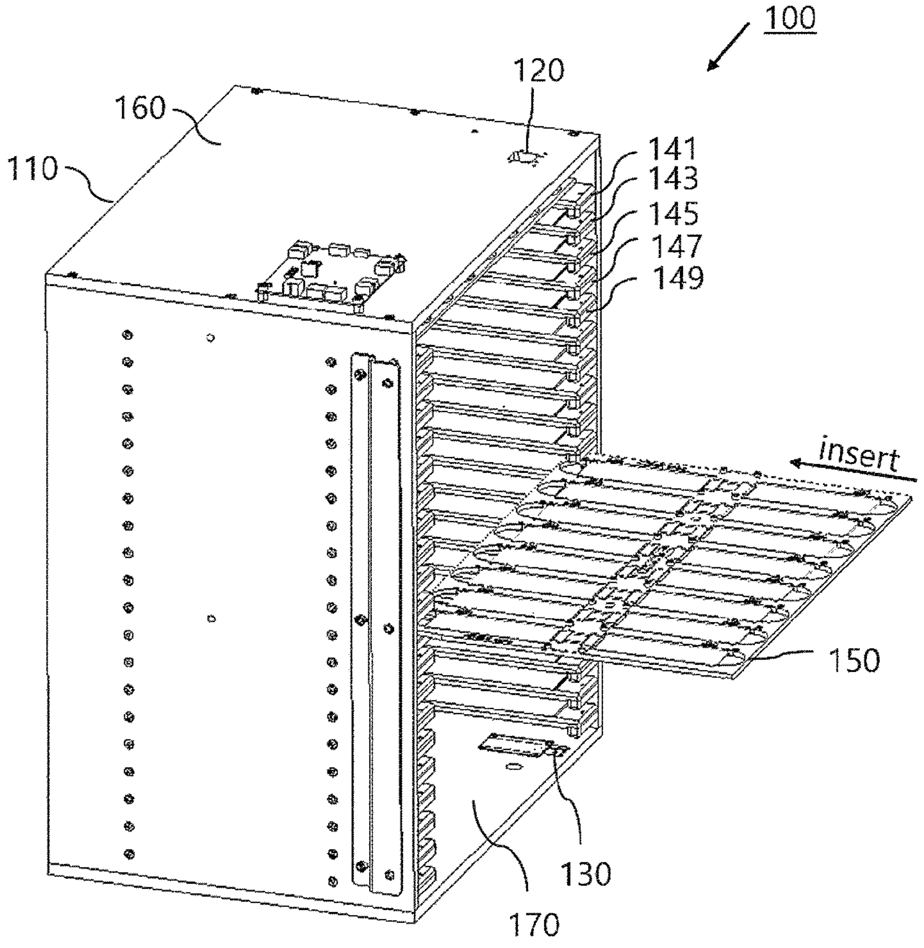

[FIG. 2]
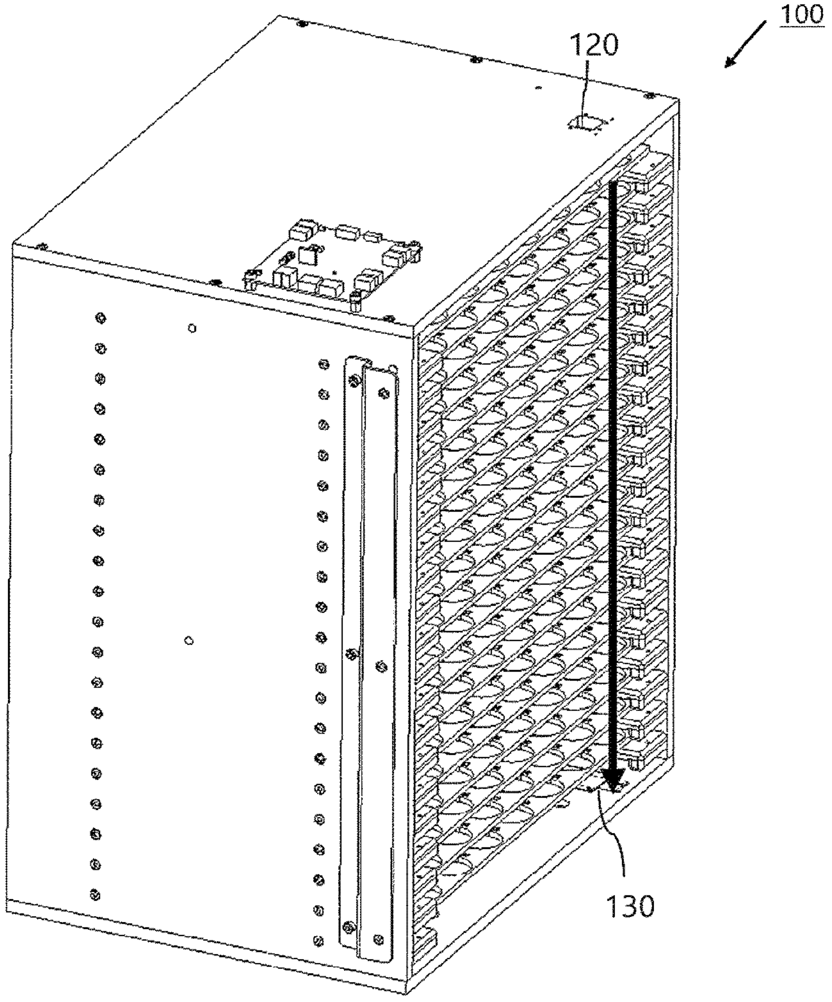

[FIG. 3]
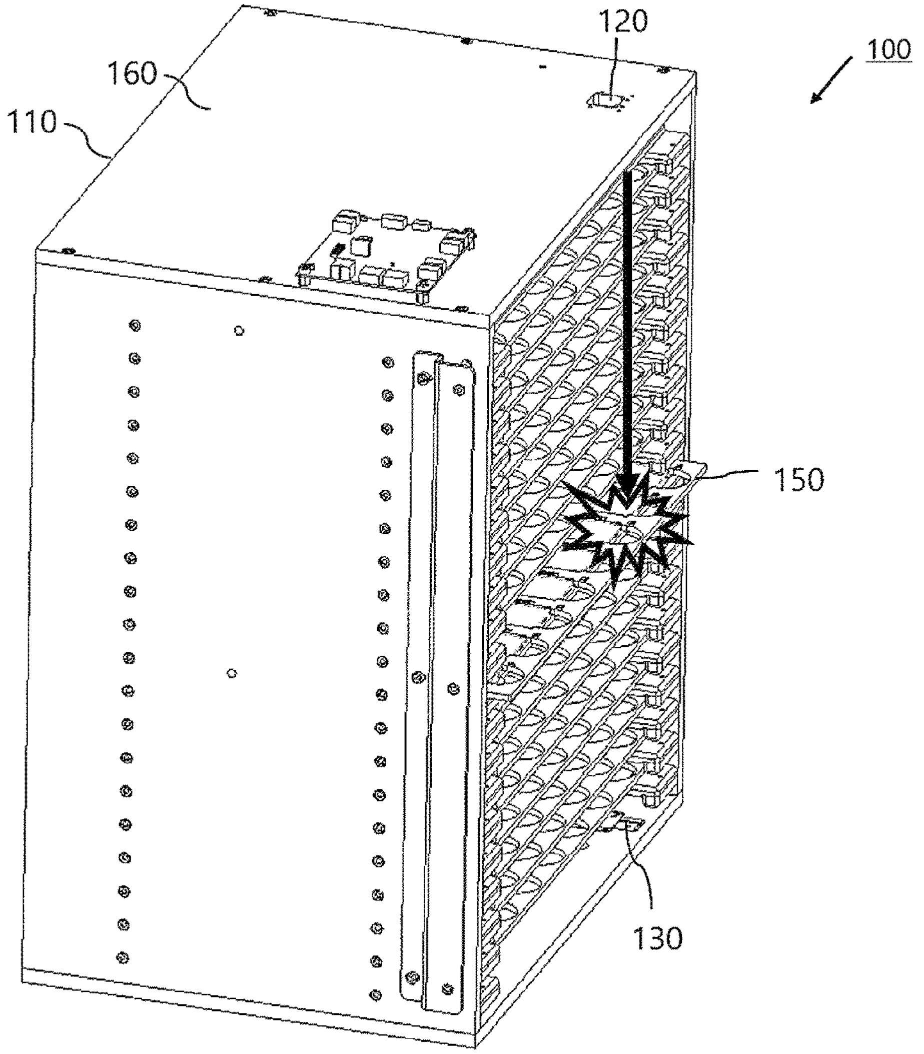

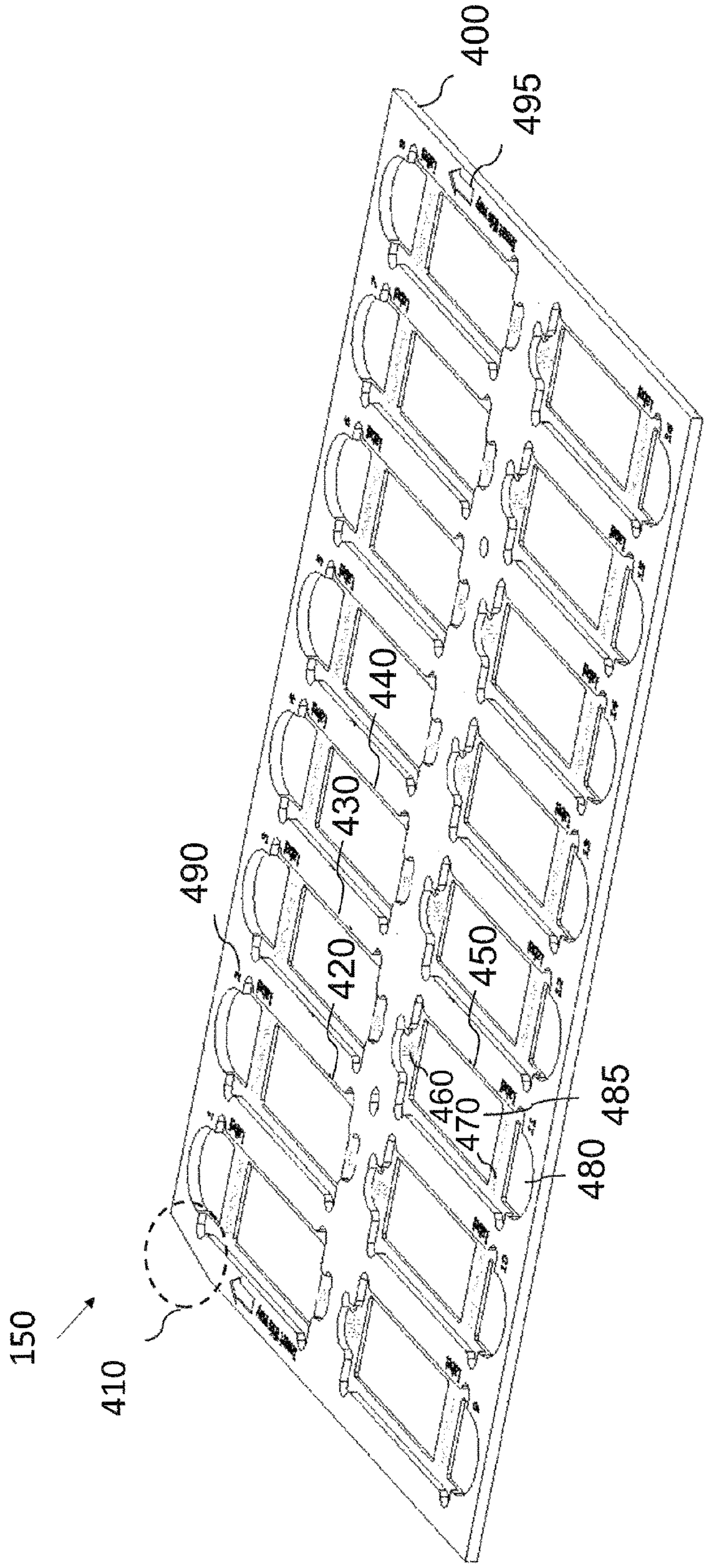
[FIG. 4]

[FIG. 5]
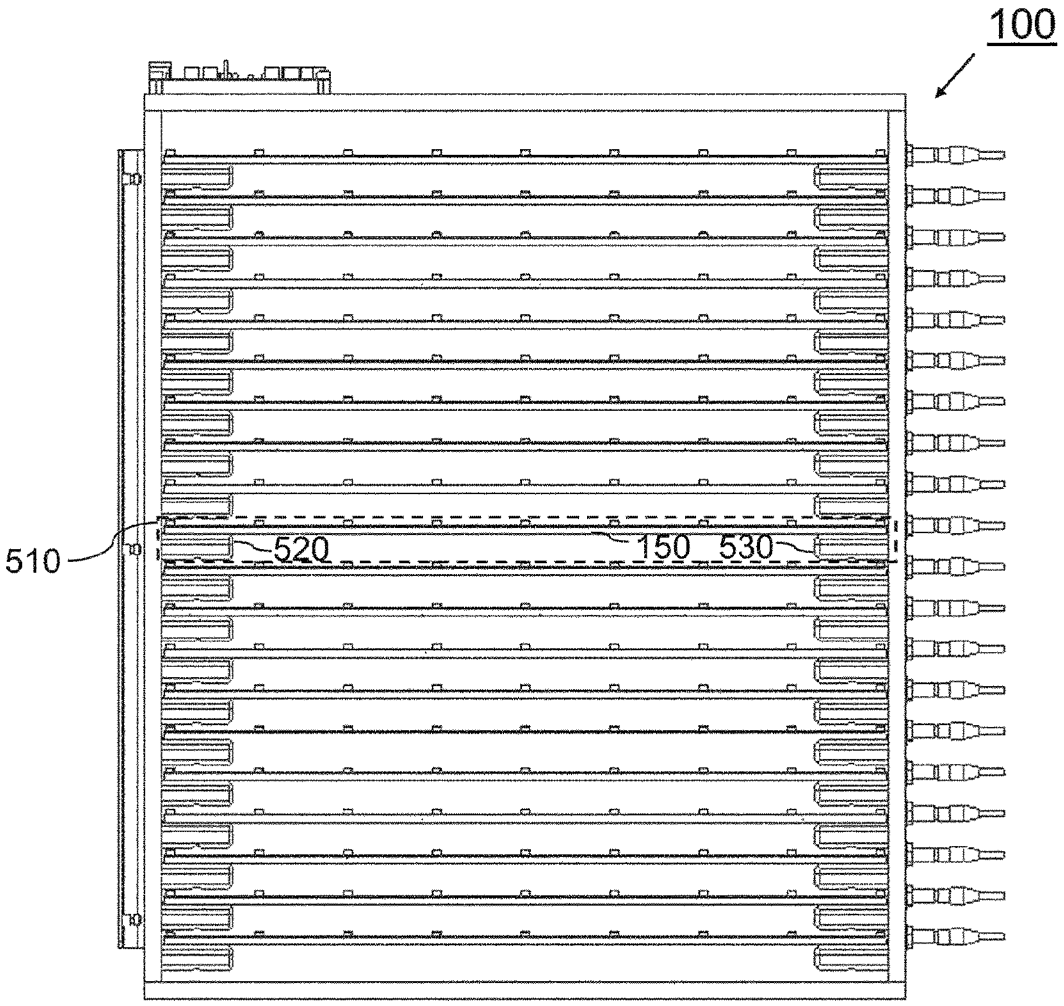

[FIG. 6]
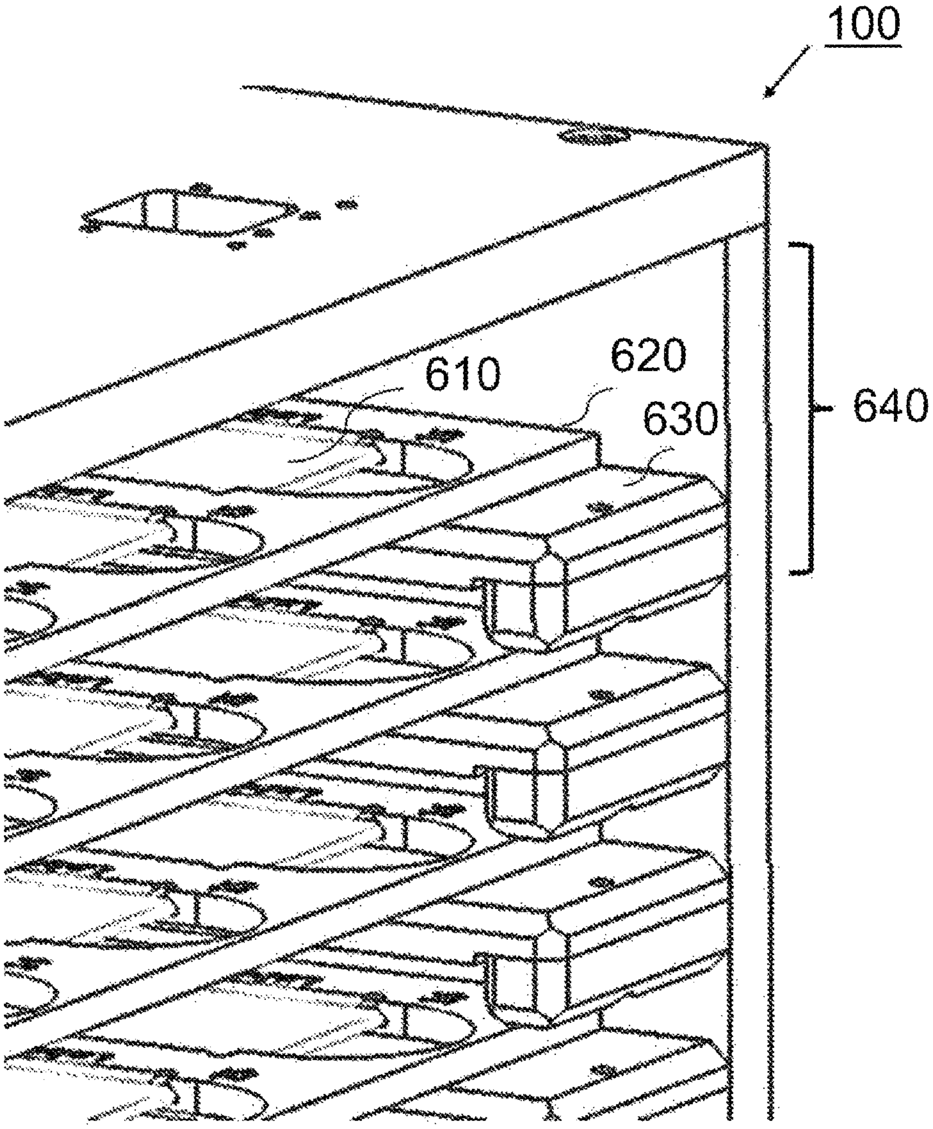

[FIG. 7]
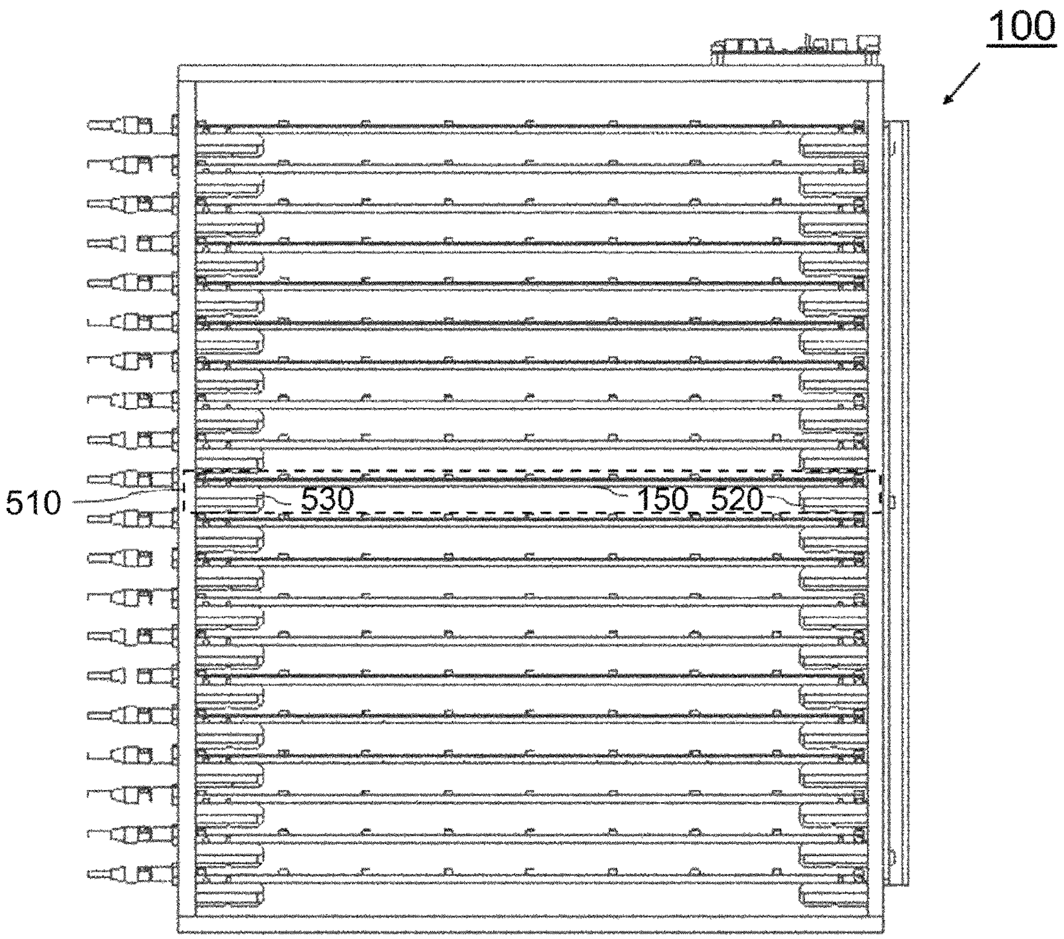

[FIG. 8]
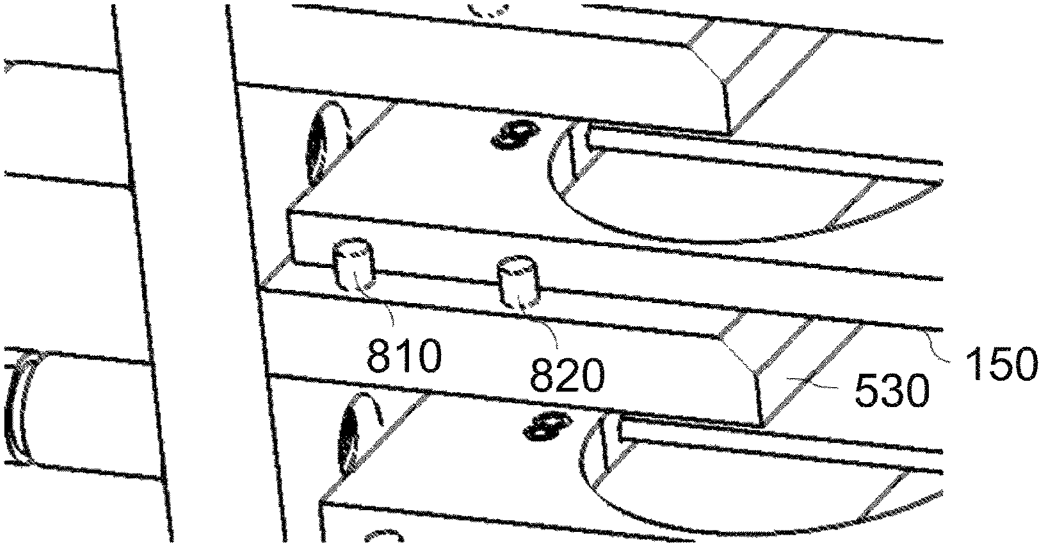

[FIG. 9]
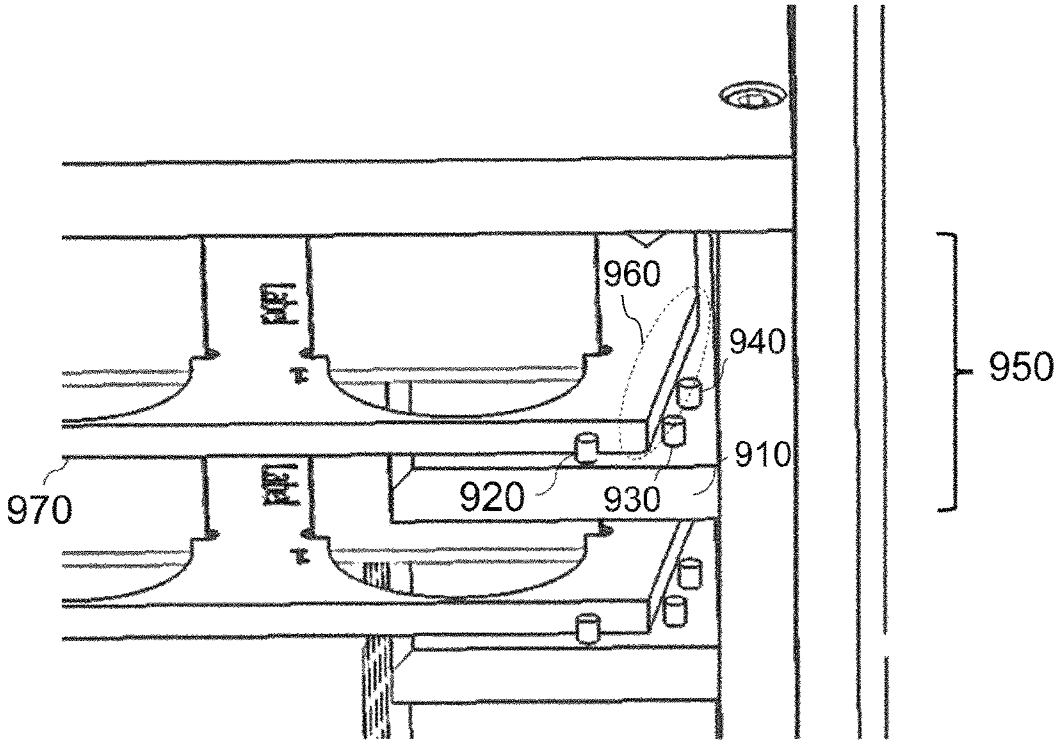

[FIG. 10]
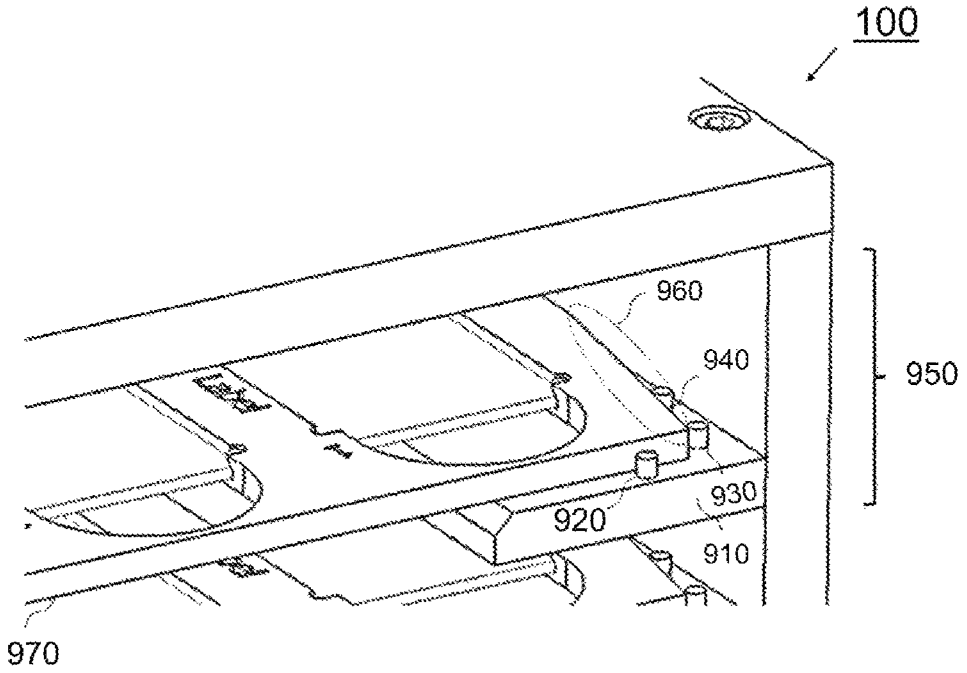

[FIG. 11]
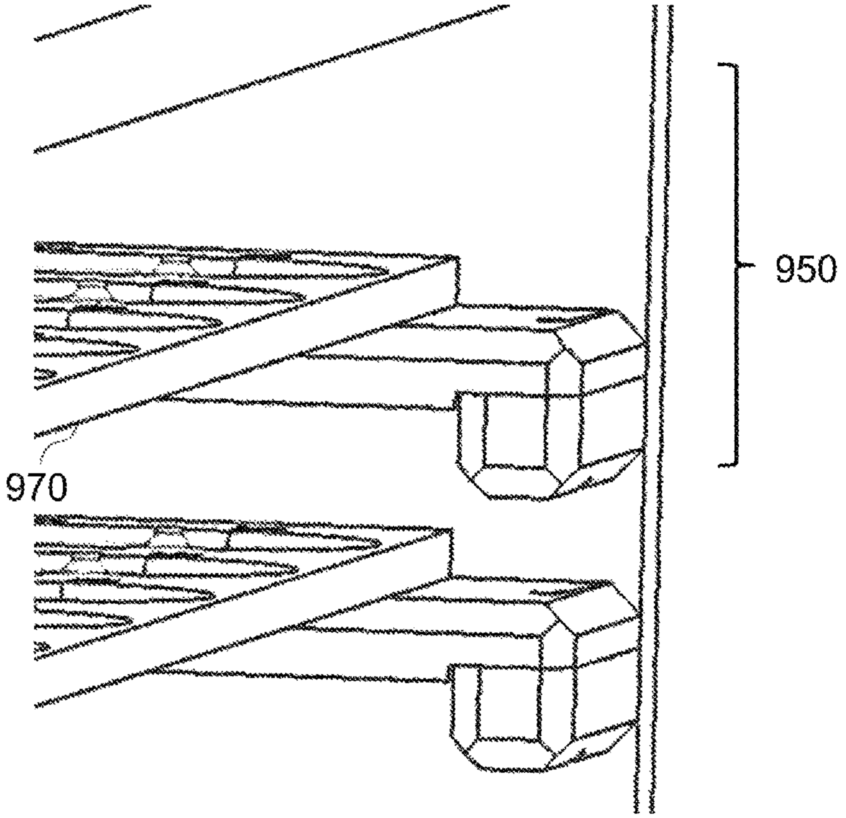

[FIG. 12]
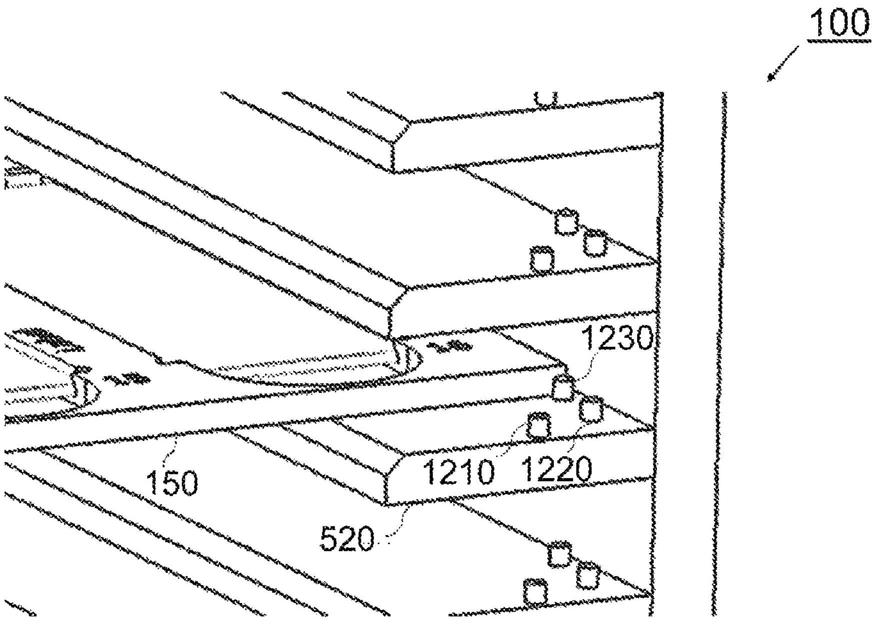

[FIG. 13]
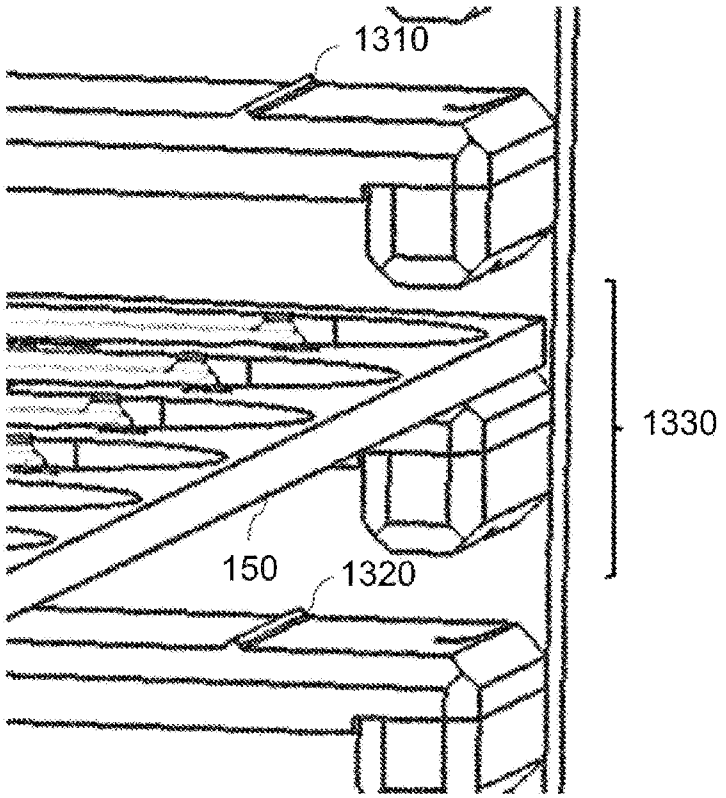

[FIG. 14]
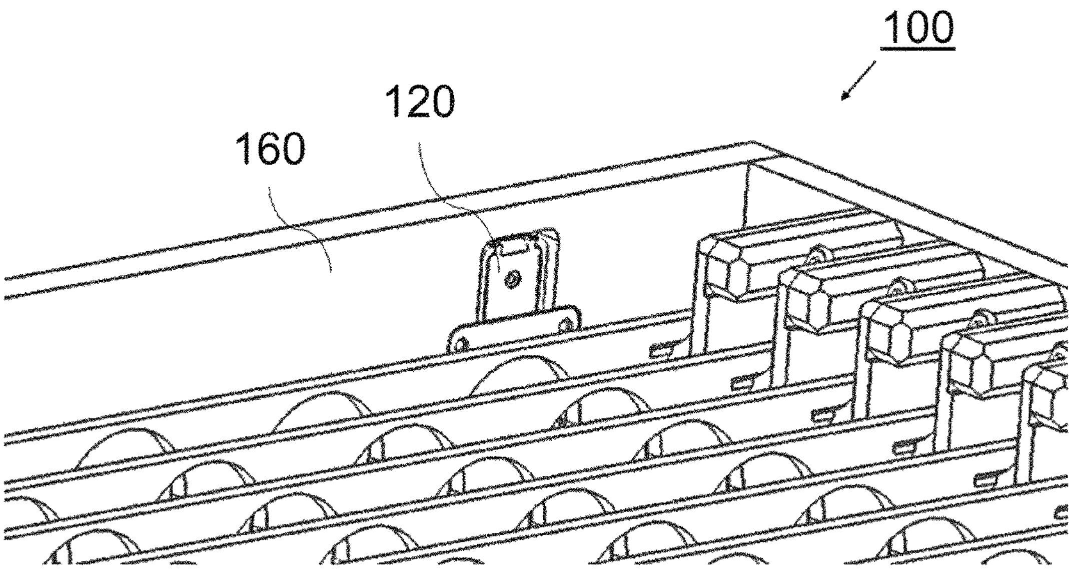

[FIG. 15]
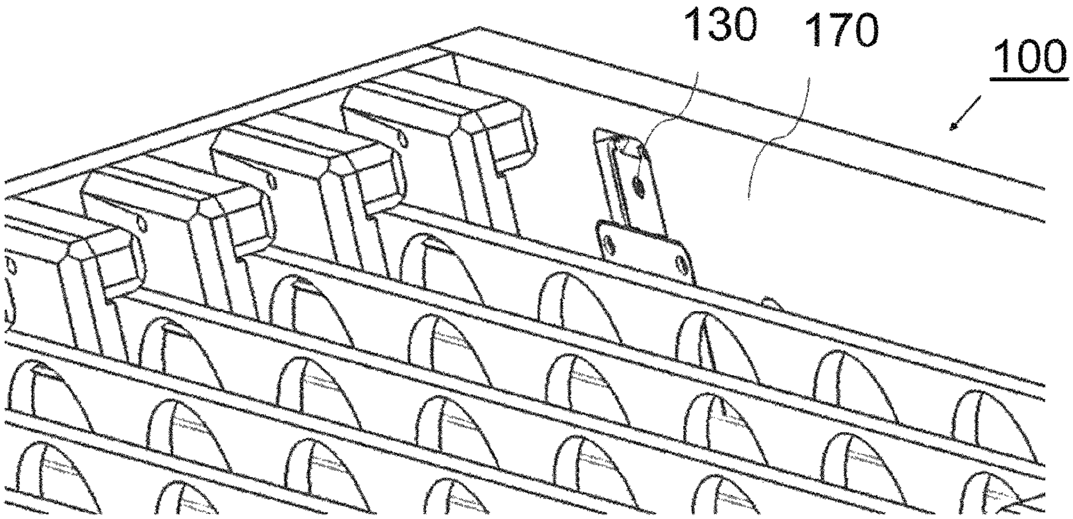

[FIG. 16]
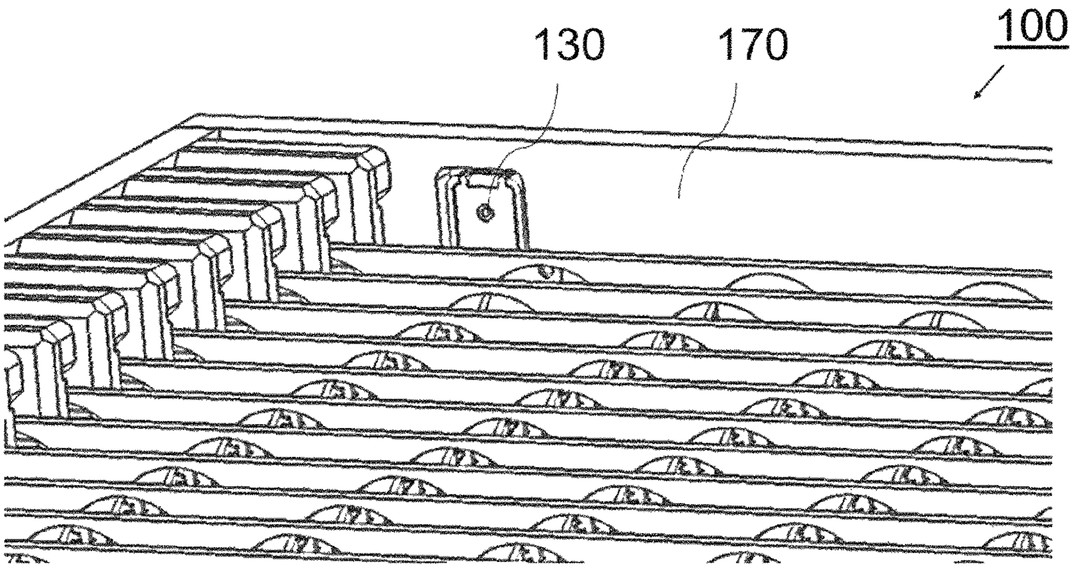

[FIG. 17]
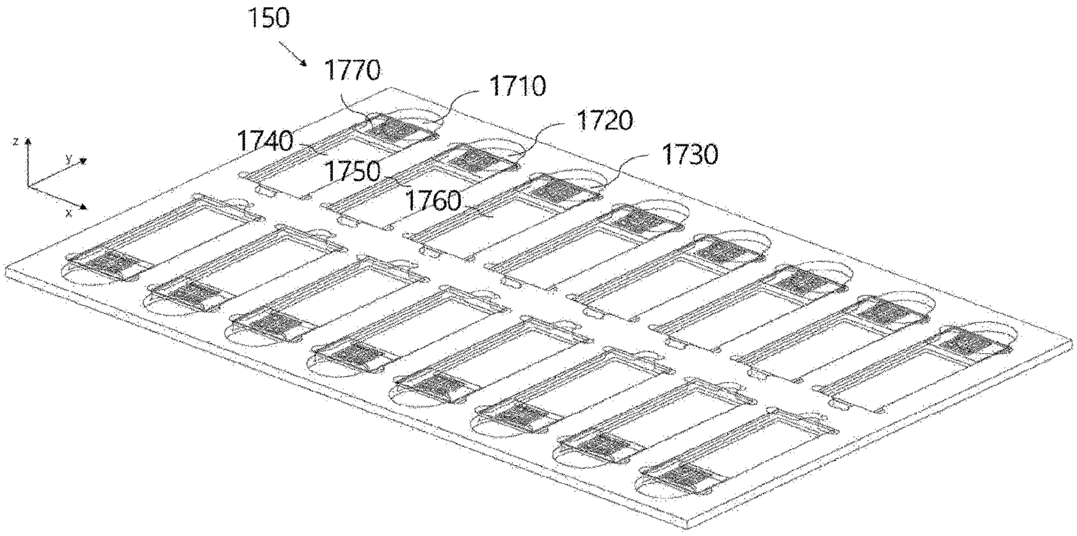

[FIG. 18]
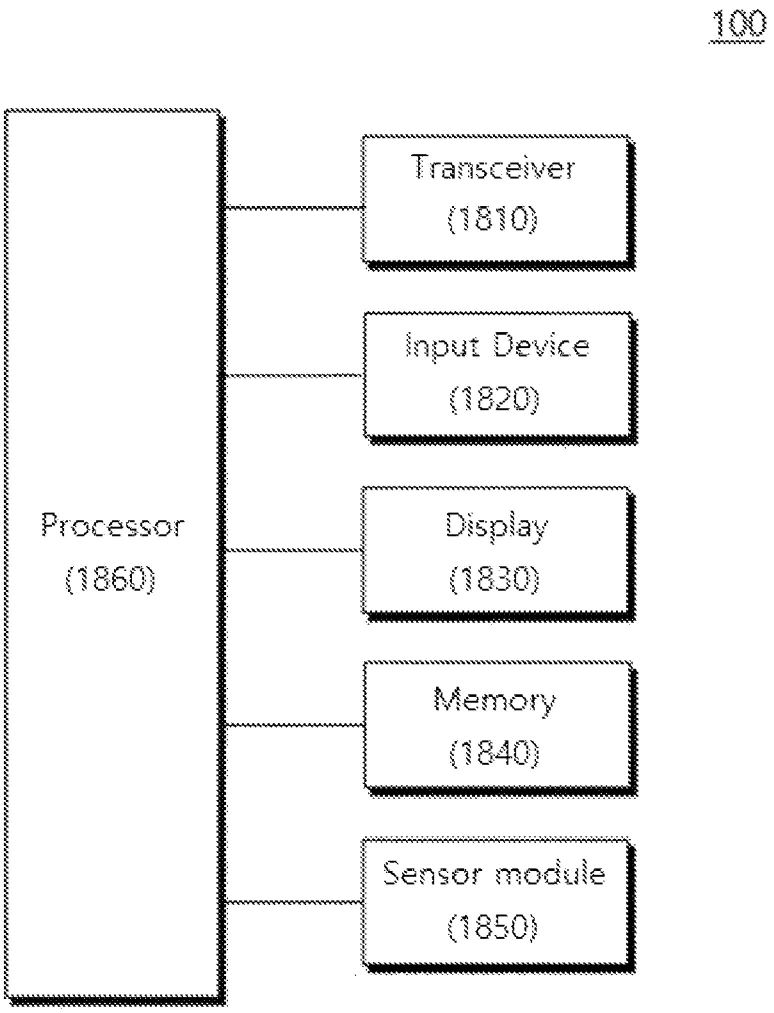

APPARATUS AND METHOD FOR CHECKING NORMAL MOUNTING OF SLIDE TRAY

CROSS-REFERENCE TO RELATED APPLICATIONS

This application is a continuation of PCT/KR2023/007338 filed on May 30, 2023, which claims priority to Korean Patent Application No. 10-2022-0138857, filed on Oct. 26, 2022, the entire contents of which are herein incorporated by reference.

TECHNICAL FIELD

The present disclosure relates to an apparatus and a method for checking normal mounting of a slide tray. More specifically, the present disclosure relates to an apparatus and a method for checking that one or more slide trays are inserted in a slide tray slot in a reference direction and normally mounted.

DESCRIPTION OF THE RELATED ART

Pathology observes and analyzes morphological changes in a patient's cells, tissues, and tissue fluids to make a diagnosis, which provides the basis for a clinician's treatment direction. In the pathology department, cytologic examination or histologic examination in the related art is usually performed by a specialist using a microscope to read and diagnose a patient's cell slide or tissue slide with the naked eye, but recently, digital slide scanners have been introduced to pathology diagnosis, and in addition to pathology diagnosis using a microscope, pathology diagnosis is performed using digital images scanned from cell stained slides or tissue stained slides.

A slide containing a patient's specimen is stored in the tray, the slide tray is stored in the slide tray slot, and the slide tray is withdrawn from the slide tray slot by a digital slide scanner or the like to perform pathology diagnosis. Unlike slide scans performed by humans, such as specialists and examiners, the orientation of the slide tray insertion into the slide tray slot should be consistent in order for the digital slide scanner to automatically withdraw the slide tray from the slide tray slot.

However, there is currently no way to check that all slide trays are inserted normally, as there are merely simple instructions such as marking the insertion direction on the slide tray, and there was an issue with digital slide scanners not scanning slides normally if even one slide tray was reversed in insertion direction. This disclosure is intended to address these issues.

SUMMARY

Technical Problem

One example embodiment of the present disclosure is intended to provide an apparatus for checking normal mounting of a slide tray and method thereof.

Technical Solutions

One example embodiment of the present disclosure seeks to provide a slide tray slot to check normal mounting of the slide tray and a method of operating the slide tray.

One example embodiment of the present disclosure may provide a slide tray slot including a slot body; a light source generator provided on one inner surface of the slot body; a light source detection sensor capable of detecting a light source emitted from the light source generator; and a plurality of slide tray compartment parts arranged in a vertical stack between the light source generator and the light source detection sensor, and the light source generator emits the light source in the direction of the vertical stack in which the plurality of slide tray compartment parts are arranged.

In one example embodiment, each of the plurality of slide tray compartment parts may be provided with a region through which light source emitted from the light source generator can pass when the slide tray is normally mounted.

In one example embodiment, it may further include at least one guide pin disposed in each of the plurality of slide tray compartment parts to provide an area through which the light source can pass.

In one example embodiment, a slide tray stored in each of the plurality of slide tray compartment parts may include a transparent area through which light source emitted from the light source generator can pass when the slide tray is normally mounted.

In one example embodiment, the slide tray slot further includes at least one processor, and the at least one processor being capable of identifying whether the light source is detected by the light source detection sensor, and displaying information on whether a slide tray is normally mounted in the plurality of slide tray compartment parts based on the light source detection.

In one example embodiment, the at least one processor may display information indicating that a slide tray is normally mounted in the plurality of slide tray compartment parts when the light source is detected by the light source detection sensor.

In one example embodiment, the at least one processor may display information indicating that a slide tray is not normally mounted in the plurality of slide tray compartment parts if the light source is not detected by the light source detection sensor after the light source is emitted by the light source generator.

In one example embodiment, the one surface of the slide tray includes a light reflective area, and if the light source is not detected by the light source detection sensor after the light source is emitted by the light source generator, the at least one processor may determine a distance from the light source generator to the one surface of the slide tray based on the light source reflected by the light reflective area, and based on the determined distance, identify a location of a slide tray compartment part not normally mounted in the slide tray slot, and display information on the location of the slide tray compartment part not normally mounted in the slide tray slot.

In one example embodiment, the light source may include a laser.

In one example embodiment, the slide tray stored in the plurality of slide tray compartment parts may include a plurality of slide holding part to which a film having an adsorbent property is attached at least in part.

One example embodiment of the present disclosure may provide a method of operating a slide tray slot, the method including: emitting a light source in the direction of a vertical stack of a plurality of slide tray compartment parts arranged therein by using a light source generator; and determining whether the light source is detected passing through the plurality of slide tray compartment parts by using a light source detection sensor, and the plurality of slide tray compartment parts are arranged in a vertical stack between the light source generator and the light source detection sensor.

In one example embodiment, each of the plurality of slide tray compartment parts may be provided with a region through which light emitted from the light source generator can pass when the slide tray is normally mounted.

In one example embodiment, each of the plurality of slide tray compartment parts may be provided with at least one guide pin to provide a region through which the light source can pass.

In one example embodiment, a slide tray stored in each of the plurality of slide tray compartment parts may include a transparent area through which light emitted from the light source generator can pass when the slide tray is normally mounted.

In one example embodiment, the method may further include, based on determining whether the light source is detected passing through the plurality of slide tray compartment parts, displaying information on whether a slide tray is normally mounted in the plurality of slide tray compartment parts.

In one example embodiment, displaying information on whether a slide tray is normally mounted in the plurality of slide tray compartment parts may include displaying information indicating that a slide tray is normally mounted in the plurality of slide tray compartment parts if the light source is detected by the light source detection sensor after the light source is emitted by the light source generator.

In one example embodiment, displaying information on whether a slide tray is normally mounted in the plurality of slide tray compartment parts may include displaying information indicating that a slide tray is not normally mounted in the plurality of slide tray compartment parts if the light source is not detected by the light source detection sensor after the light source is emitted by the light source generator.

In one example embodiment, displaying information on whether a slide tray is normally mounted in the plurality of slide tray compartment parts may include: determining a distance from the light source generator to a bottom surface of the slide tray based on a light source reflected by a light reflective region of a bottom surface of the slide tray, if the light source is not detected by the light source detection sensor after the light source is emitted by the light source generator; identifying, based on the determined distance, a location of a slide tray compartment parts that is not normally mounted in the slide tray slot; and displaying information on the location of the slide tray compartment parts that is not normally mounted in the slide tray slot.

In one example embodiment, the light source may include a laser.

In one example embodiment, the slide tray stored in the plurality of slide tray compartment parts may include a plurality of slide holding part to which a film having an adsorbent property is attached at least in part.

Effects

According to one example embodiment of the present disclosure, it may contribute to the automation of pathology systems by enabling verification that slide trays are normally mounted.

Furthermore, according to one example embodiment of the present disclosure, it may contribute to providing a more efficient pathology system by displaying information on the success of normal mounting of the slide tray.

BRIEF DESCRIPTION OF THE DRAWINGS

FIG. 1 is a perspective view of a slide tray slot for insertion of a slide tray according to one example embodiment of the present disclosure.

FIG. 2 is a diagram illustrating a slide tray slot when slide trays are normally mounted according to one example embodiment of the present disclosure.

FIG. 3 is a diagram illustrating a slide tray slot when one or more slide trays are not normally mounted according to one example embodiment of the present disclosure.

FIG. 4 is a diagram illustrating a slide tray according to one example embodiment of the present disclosure.

FIG. 5 is a front view of a slide tray slot in which a slide tray is mounted according to one example embodiment of the present disclosure.

FIG. 6 is a front perspective view illustrating a portion of a slide tray slot according to one example embodiment of the present disclosure.

FIG. 7 is a front view of a slide tray slot according to one example embodiment of the present disclosure.

FIG. 8 is a rear perspective view of a portion of a slide tray slot that includes a guide pin according to one example embodiment of the present disclosure.

FIG. 9 is a rear perspective view of a portion of a slide tray slot that includes a guide pin according to one example embodiment of the present disclosure.

FIG. 10 is a rear perspective view of a portion of a slide tray slot when the slide tray is normally mounted according to one example embodiment of the present disclosure.

FIG. 11 is a front perspective view of a portion of a slide tray slot when the slide tray is normally mounted according to one example embodiment of the present disclosure.

FIG. 12 is a rear perspective view of a portion of a slide tray slot when the slide tray is not normally mounted according to one example embodiment of the present disclosure.

FIG. 13 is a front perspective view of a portion of a slide tray slot when the slide tray is not normally mounted according to one example embodiment of the present disclosure.

FIG. 14 is a diagram illustrating an apparatus provided in the ceiling part of a slide tray slot according to one example embodiment of the present disclosure.

FIG. 15 is a diagram illustrating an apparatus provided on a support part of a slide tray slot according to one example embodiment of the present disclosure.

FIG. 16 is a diagram illustrating an apparatus provided on a support part of a slide tray slot according to one example embodiment of the present disclosure.

FIG. 17 is a diagram illustrating a slide tray with a slide stored therein according to one example embodiment of the present disclosure.

FIG. 18 is a block diagram of a slide tray slot according to one example embodiment of the present disclosure.

DETAILED DESCRIPTION

In order to clarify the technical ideas of the present disclosure, example embodiments of the present disclosure are described in detail with reference to the accompanying drawings. In describing this disclosure, specific descriptions of relevant disclosed features or components will be omitted if it is determined that such detailed description would unnecessarily obscure the essence of this disclosure. In the drawings, components having substantially the same functional configuration are given the same reference numerals and symbols wherever possible, even if they are shown in different drawings. For ease of description, apparatus and methods are described together where necessary. Each operation of the present disclosure need not be performed in the order described and may be performed in parallel, optionally, or separately.

The terminology used in the example embodiments of the present disclosure has been chosen to be as generic as possible in current popular usage while taking into account the features of the disclosure, but may vary according to the intent of those skilled in the art or precedent, the emergence of new technologies, and the like. In addition, in certain instances, terms are arbitrarily chosen by the applicant, in which case their meaning will be set forth in detail in the description of the applicable example embodiment. Accordingly, terms used in this specification are to be defined based on the meaning of the term and the context of the disclosure as a whole, and not merely on the name of the term.

Throughout this disclosure, singular expressions may include plural expressions unless the context clearly indicates otherwise. Terms such as "includes" or "has" are intended to specify the presence of a feature, number, step, operation, component, part, or combination thereof, and are not intended to preclude the possibility of the presence or addition of one or more other features, numbers, steps, operations, components, parts, or combinations thereof. In other words, throughout this disclosure, when it is said that a part "includes" a component, it means that it may further include other components, not exclude other components, unless specifically stated to the contrary.

Expressions such as "at least one" modify the entire list of components, not the components of the list individually. For example, "at least one of A, B, and C" and "at least one of A, B, or C" refer to merely A, merely B, merely C, both A and B, both B and C, both A and C, all A, B, and C, or any combination.

In addition, the terms " . . . part," " . . . module," and the like as used in this disclosure refer to a unit that handles at least one function or operation, which may be implemented in hardware or software, or a combination of hardware and software.

Throughout this disclosure, when a part is the to be "connected" to another part, this includes not only being "directly connected" but also being "electrically connected" with another element in between. Also, when a part is the to "include" a component, it is meant to be capable of including additional components, not to exclude other components, unless specifically stated to the contrary.

As used throughout this disclosure, the expression "configured to" may be used interchangeably with, for example, "suitable for," "having the capacity to," "designed to," "adapted to," "made to," or "capable of," depending on the context. The term "configured (or set up) to" may not necessarily mean "specifically designed for" hardware. Instead, in some situations, the phrase "system configured to" may mean that the system is "capable of" working with other apparatuses or components. For example, the phrase "a processor configured (or set) to perform A, B, and C" may refer to a processor dedicated to performing those actions (for example, an embedded processor), or a generic-purpose processor (for example, a central processing unit (CPU) or application processor) that may perform those actions by executing one or more software programs stored in memory.

Throughout this disclosure, a slide is a thin, flat piece of glass used to fix a specimen, and may include a slide glass, glass slide, specimen slide, microscope slide, a specimen placed on a slide glass and covered with a cover glass, and the like. Of course, it is not limited to the above examples.

Throughout this disclosure, a slide tray is a case for transporting or storing slides and may also be referred to as a tray, glass plate, slide plate, slide holder, glass holder, slide case, glass case, slide folder, glass folder, and the like.

Throughout this disclosure, adsorption may refer to the property of adhesion of atoms, ions, or molecules from a gas, liquid, or dissolved solid to a surface. In one example embodiment, adsorption may include physical adsorption characterized by weak van der Waals forces, chemical adsorption characterized by covalent bonds, electrostatic adsorption characterized by electrostatic attraction, and furthermore, tackiness.

Throughout this disclosure, a slide tray slot is an apparatus for storing slide trays, which may also be referred to as a cabinet for storing slide trays, a slide tray cabinet, a slide tray storage cabinet, a slide tray rack, and the like.

FIG. 1 is a perspective view of a slide tray slot for insertion of a slide tray according to one example embodiment of the present disclosure.

Referring to FIG. 1, the slide tray slot 100 may include a slot body 110, a light source generator 120, a light source detection sensor 130, a plurality of slide tray compartment parts 141, 143, 145, 147, 149, and the like. However, this is merely an example, and slide tray slot 100 may include more components, or may include merely some of the components shown. In one example embodiment, the light source generator 120 may be provided on an one inner surface of the slot body, and the light source detection sensor 130 may be provided on an one surface of the slot body 110 corresponding to the surface on which the light source generator 120 is provided to detect the light source emitted from the light source generator 120. For example, the light source generator 120 may be provided in the ceiling part 160 of the slot body 110 and the light source detection sensor 130 may be provided in the support part 170 of the slot body 110. However, this is merely an example and it is possible that the light source generator 120 is provided on the support part 170 and the light source detection sensor 130 is provided on the ceiling part 160. For example, the light source generator 120 may emit a laser.

In one example embodiment, the plurality of slide tray compartment parts may be arranged in a vertical stack between the light source generator 120 and the light source detection sensor 130. A slide tray 150 may be inserted into a slide tray compartment part in the slide tray slot 100. The slide tray compartment may include a slot block to support the slide tray 150.

In one example embodiment, the light source generator 120 may emit a light source in a vertical stack direction in which the plurality of slide tray compartment parts are arranged, and the light source detection sensor 130 may detect the emitted light source when a slide tray is normally mounted in the plurality of slide tray compartment parts. A method by which the light source detection sensor 130 detects the emitted light source based on whether the slide trays are normally mounted will be described in more detail with reference to FIGS. 2 and 3.

Throughout this disclosure, in connection with a method for determining whether a slide tray is normally mounted in a plurality of slide tray compartment parts, Throughout this disclosure, reference is made to a method of determining whether a slide tray is normally mounted in a plurality of slide tray compartments, a method of utilizing whether a light source emitted from a light source generator 120 is detected by a light source detection sensor 130 is described as an example, but is not limited to utilizing a light source, and it is possible to determine whether a slide tray is normally mounted by utilizing whether a signal generated by a particular signal generator provided at a location corresponding to the light source generator 120 is detected by a signal detection sensor provided at a location corresponding to the light source detection sensor 130, and it is possible to determine whether a slide tray is normally mounted by utilizing a physical tool. For example, it may be determined whether the slide tray is normally mounted based on whether a hole is formed at the location of the light source generator 120 and whether the stick may reach the location of the light source detection sensor 130 by placing it in the hole. In these various ways, it may be determined whether the slide tray is normally mounted based on a hole or at least one apparatus provided in at least one of the ceiling part 160 and the support part 170.

FIG. 2 is a diagram illustrating a slide tray slot when slide trays are normally mounted according to one example embodiment of the present disclosure.

Referring to FIG. 2, each of the plurality of slide tray compartment parts may be provided with a region through which a light source emitted from the light source generator 120 may pass when the slide trays are normally mounted. Accordingly, when the slide trays are normally mounted in the slide tray slot 100, the light source emitted by the light source generator 120 may reach the light source detection sensor 130, and the light source detection sensor 130 may detect the light source.

The slide tray slot 100 may further include a processor (not shown). In one example embodiment, the processor may determine that the slide trays are normally mounted if a light source is detected by the light source detection sensor 130. Further, the processor may output information indicating that the slide trays are normally mounted. For example, the processor may emit a light of a particular color (for example, green), display a particular phrase, such as "success," or output a particular sound through a speaker.

FIG. 3 is a diagram illustrating a slide tray slot when one or more slide trays are not normally mounted according to one example embodiment of the present disclosure.

Referring to FIG. 3, when at least one slide tray 150 is not normally mounted in the slide tray slot 100, the light emitted from the light source generator 120 is absorbed or reflected by the slide tray 150 and may not reach the light source detection sensor 130. Accordingly, the light source detection sensor 130 is unable to detect the light emitted from the light source generator 120.

The slide tray slot 100 may further include a processor (not shown). In one example embodiment, the processor may identify that a light source has been emitted by the light source generator 120 and determine that a slide tray is not normally mounted in at least one of the plurality of slide tray compartment parts if the light source is not detected by the light source detection sensor 130 within a certain time period. The processor may also output information to indicate that the slide tray is not mounted normally. For example, it may emit a light of a specific color (for example, red), display a specific phrase, such as "fail," or emit a specific sound through a speaker.

In one example embodiment, the one surface of the slide tray 150 may include a light reflective area. In addition, the ceiling part 160 with the light source generator 120 of the slot body 110 may further include a second light source detection sensor (not shown). The processor may identify that a light source is emitted by the light source generator 120. Further, as the slide tray 150 is not normally mounted, the light source may be reflected by a light reflective area of the slide tray 150. Further, the processor may determine a distance from the light source generator 120 to one surface of the slide tray 150 based on detection of the reflected light source by the second light source detection sensor (not shown). For example, a distance from the light source generator 120 to the one surface of the slide tray 150 may be determined based on a difference between a time when the light source is emitted by the light source generator 120 and a time when the reflected light source is detected by the second light source detection sensor (not shown). Further, the processor may identify a location of the slide tray compartment part that is not normally mounted in the slide tray slot 100, based on a distance from the light source generator 120 to one surface of the slide tray 150. Further, the processor may output information on the location of the slide tray compartment part that is not normally mounted in the slide tray slot 100. For example, the processor may control a light emitting diode (LED) provided at the corresponding location to illuminate, output information on the location to a display provided in the slide tray slot 100, or output a sound indicating the corresponding location using a speaker.

FIG. 4 is a diagram illustrating a slide tray according to one example embodiment of the present disclosure.

Referring to FIG. 4, the slide tray 150 may include a planar member 400. In one example embodiment, the planar member 400 may include an end region 410 that is shaped in the form of a rectangle with some of the corners cut off. Due to the presence of the end region 410, it may be easily determined whether the slide tray 150 is normally mounted in the slide tray slot. In one example embodiment, the end region 410 is a region that contacts the guide pin, and the role of the end region 410 will be described in more detail with reference to FIGS. 9 to 15.

In one example embodiment, one surface of the planar member 400 may have a plurality of slide holding part formed as grooves for storing slides. For example, the plurality of slide holding part may include a first slide holding part 420, a second slide holding part 430, a third slide holding part 440, a fourth slide holding part 450, and the like. In one example embodiment, the plurality of slide holding part may be in the form of a groove formed in the planar member 400 that is at least as thick as the slide.

In one example embodiment, the plurality of slide holding part may be formed at predetermined intervals on the planar member 400. For example, using the slide tray 150 of FIG. 4 as an example, a planar member 400 may have eight slide holding parts, including a first slide holding part 420, a second slide holding part 430, and a third slide holding part 440, formed at predetermined intervals in a first row of the planar member 400, and the eight slide holding parts, including the fourth slide holding part 450, may be formed at predetermined intervals in a second row that is different from the first row. Furthermore, the slide holding part formed in the first row and the slide holding part formed in the second row may be formed at predetermined intervals from each other. However, this is merely an example, and various variations are possible, including, but not limited to, the number of slide holding part included in the slide tray 150, the shape of the planar member 400, and the form in which the plurality of slide holding part are formed at predetermined intervals.

In one example embodiment, each of the plurality of slide holding part may be formed at least in part as a hollow part. For example, the fourth slide holding part 450 may have a first hollow part 480 and a second hollow part 485 formed. Alternatively, merely the first hollow part 480 may be formed in the fourth slide holding part 450. However, this is merely an example and each of the plurality of slide holding part may include at least one of the hollow part corresponding to the first hollow part 480 and the hollow part corresponding to the second hollow part 485, and may further include hollow part other than the hollow part corresponding to the first hollow part 480 and the hollow part corresponding to the second hollow part 485.

In one example embodiment, the first hollow part 480 is a hollow part for lifting a slide stored from the slide holding part, and a user of the slide tray 150 may use the first hollow part 480 to comfortably lift a slide stowed in the slide tray 150. Accordingly, the first hollow part 480 may correspond to a hole of a size that is comfortable for a human finger to grip the slide. In one example embodiment, the first hollow part 480 may include an outwardly curved surface. For example, the first hollow part 480 may have a shape including a circle, a semicircle, or a portion of a circumference and a straight line.

In one example embodiment, an adsorbent film 460, 470 may be attached to at least a portion of each of the plurality of slide holding part so that the slide is removably attached to the storing part. The adsorbent films 460, 470 may serve to fix the relative position of the slide and the slide holding part when the slide is stored in the slide holding part. When a slide is stored in the slide holding part, a bonding force between the slide and the slide holding part may be generated by the adsorbent film. For example, the bonding force between the slide and the slide holding part may be an intermolecular bonding force and may include an electrostatic force.

In one example embodiment, the adsorptive films 460, 470 may include electrostatic force films, porous adsorption films, films utilizing van der waals force, covalent force films, adhesive films, and the like. For example, if a porous adsorbent film is utilized, the slide may be stored in the slide holding part by vacuum adsorption method through the porous material between the slide and the slide holding part. Further, an example of an adhesive film may be an adhesive tape.

According to one example embodiment, by using the adsorptive films 460, 470 to increase the holding force between the slide tray and the slide, no energy supply other than a moderate external force may be required to lift the slide. This may reduce the cost of manufacturing the slide tray by eliminating the need for other equipment such as springs, electrical wiring, air piping, and the like.

In one example embodiment, the films 460, 470 having adsorbent properties may include a base of a polymer-based material and a coating layer including a resin material. According to one example embodiment, repeated use of the slide tray may be possible by utilizing a coating layer including a resin material. Furthermore, if the adsorbent film loses its adsorption capacity after many repeated uses, the adsorbent film may be replaced with a new one.

The first adsorbent film 460 and the second adsorbent film 470 may have different shapes. For example, the first adsorbent film 460 may be circular in shape and the second adsorbent film 470 may be rectangular in shape. However, this is an example and not a limitation, and the adsorbent films that adhere to the slide holding part may be identical or different from each other, and may have various shapes, such as circles, semicircles, rectangles, polygons, and shapes with rounded corners.

The description with reference to FIG. 4 is by way of illustration that various shapes and various numbers of films may be attached to the plurality of slide holding part, and is not limited to how the films are attached. Any suitable number and shape of films may be attached to any suitable location of the slide holding part, taking into account the appropriate strength of the external force required for sufficient retention of the slide and ease of removal.

In one example embodiment, the first hollow part 480 may be a hollow part for lifting a slide stored in the fourth slide holding part 450 out of the fourth slide holding part 450. When a slide is stored on one surface of the fourth slide holding part 450, some areas of the first hollow part 480 may be covered by the slide in a direction orthogonal to the one surface of the planar member 400, and other areas may be exposed in a direction orthogonal to the one surface of the planar member 400. Additionally, if a slide is stored on one surface of the fourth slide holding part 450, the entire area of the second hollow part 485 may be covered by the corresponding slide.

In one example embodiment, the planar member 400 may display identification information for the slide tray 150, reference orientation information 495 for inserting the slide tray into the slide scanner, and identification information 490 for the slide holding part. For example, identification information for the slide tray 150 may include a serial number of the slide tray 150, identification information for the slide holding part may include identification numbers indicating the order of the slide holding part, and the like. In one example embodiment, a slide scanner may be equipment that scans a slide stored in the slide tray 150 into a high-resolution digital image. The slide scanner may also be referred to as a digital slice scanner, and may automatically scan a plurality of slides to create a virtual slide image.

According to one example embodiment, the slide tray 150 may include identification information for the slide tray, reference orientation information 495 for insertion into a slide scanner, and the like, so that information which may facilitate analysis of the slides accommodated in the slide tray may be provided.

FIG. 5 is a front view of a slide tray slot in which a slide tray is mounted according to one example embodiment of the present disclosure.

Referring to FIG. 5, a slide tray may be mounted in each of the plurality of slide tray compartment parts in the slide tray slot 100. In one example embodiment, the slide tray compartment part 510 may include a first slot block 520 and a second slot block 530 that may support the slide tray 150. When the slide tray 150 is inserted into the slide tray compartment part 510, the slide tray 150 may be mounted in the slide tray compartment part 510 by the vertical drag exerted on the slide tray 150 by the one or more slot blocks 520, 530.

FIG. 6 is a front perspective view illustrating a portion of a slide tray slot according to one example embodiment of the present disclosure.

Referring to FIG. 6, a slide tray 620 in which the slide 610 is stored may be mounted in the slide tray slot 100. In one example embodiment, the slide tray compartment part 640 includes a slot block 630 for supporting the slide tray 620, and the slide tray 620 may be stowed over the slot block 630.

FIG. 7 is a front view of a slide tray slot according to one example embodiment of the present disclosure.

Referring to FIG. 7, a slide tray may be mounted in each of the plurality of slide tray compartment parts in the slide tray slot 100. In one example embodiment, the slide tray compartment part 510 may include a first slot block 520 and a second slot block 530 that may support the slide tray 150. FIG. 5 is a front view of the slide tray slot 100, and FIG. 7 is a rear view of the slide tray slot 100, and the first slot block 520 in FIG. 5 may correspond to the first slot block 520 in FIG. 7, and the second slot block 530 in FIG. 5 may correspond to the second slot block 530 in FIG. 7. In one example embodiment, at least one of the first slot block 520 and the second slot block 530 may be provided with one or more guide pins. For example, the second slot block 530 may be provided with two guide pins, which will be discussed further with reference to FIG. 8. In addition, the first slot block 520 may be provided with three guide pins, which will be described further with reference to FIG. 9. However, FIGS. 8 and 9 are exemplary, and the location and number of guide pins may be varied. In one example embodiment, when the slide tray 150 is inserted into the slide tray compartment part 510, the slide tray 150 may be mounted in the slide tray compartment part 510 by the vertical drag exerted on the slide tray 150 by the one or more slot blocks 520, 530.

FIG. 8 is a rear perspective view of a portion of a slide tray slot that includes a guide pin according to one example embodiment of the present disclosure.

Referring to FIG. 8, each of the plurality of slide tray compartment parts may include a second slot block 530. The second slot block 530 may correspond to the second slot block 530 described above with reference to FIG. 5 and the second slot block 530 described above with reference to FIG. 7. In one example embodiment, the second slot block 530 may include a first guide pin 810 and a second guide pin 820. The first guide pin 810 and the second guide pin 820 may act as guides to guide the slide tray 150 to a predetermined position when the slide tray 150 is inserted into the slide tray compartment part. That is, the slide tray 150 may be inserted into the slide tray compartment part until it contacts the first guide pin 810 and the second guide pin 820. In FIG. 8, two guide pins are shown disposed side-by-side, but this is merely an example and the second slot block 530 may include fewer or more guide pins, each of which may be arranged in a suitable position to guide the slide tray 150 to a predetermined position.

FIG. 9 is a rear perspective view of a portion of a slide tray slot that includes a guide pin according to one example embodiment of the present disclosure.

Referring to FIG. 9, each of the plurality of slide tray compartment parts may include a slot block. For example, the first slide tray compartment part 950 may include a first slot block 910. The first slot block 910 may correspond to the first slot block 520 described above with reference to FIG. 5 and the first slot block 520 described above with reference to FIG. 7. In one example embodiment, the first slot block 910 may include a third guide pin 920, a fourth guide pin 930, and a fifth guide pin 940. The third guide pin 920, fourth guide pin 930, and fifth guide pin 940 located on the first slot block 910 may serve as guides to guide the first slide tray 970 to a predetermined position when the first slide tray 970 is inserted into the first slide tray compartment part 950. In particular, the first slide tray 970 may be inserted into the first slide tray compartment part 950 until the end region 960 of the first slide tray 970 contacts the third guide pin 920, the fourth guide pin 930, and the fifth guide pin 940. Accordingly, the third guide pin 920, the fourth guide pin 930, and the fifth guide pin 940 may be arranged on one surface of the first slot block 910 to correspond to the shape of the end region 410. For example, the third guide pin 920 may be disposed to contact one edge of the slide tray like the first guide pin 810 and second guide pin 820 described above with reference to FIG. 8, and the fourth guide pin 930 and fifth guide pin 940 may be disposed to contact an edge of the end region.

According to one example embodiment, the guide pins located on the first slot block 910 may be positioned to correspond to the shape of the end region, such that if the slide tray is inserted in the opposite direction of the reference orientation or is inserted upside down, the slide tray may not be fully inserted into the slide tray compartment part.

In FIG. 9, three guide pins are shown disposed on the first slot block 910, but this is merely an example and the first slot block 910 may include fewer or more guide pins, each of which may be arranged in a suitable position to guide the first slide tray 970 to a predetermined position.

FIG. 10 is a rear perspective view of a portion of a slide tray slot when the slide tray is normally mounted according to one example embodiment of the present disclosure.

Referring to FIG. 10, when the slide tray 970 is normally mounted in the slide tray compartment part 950 of the slide tray slot 100, the end region 960 of the slide tray 970 may be in contact with the guide pins 920, 930, 940. Accordingly, the slide tray 970 may be inserted until it contacts the guide pins 920, 930, 940, and when fully inserted until it contacts the guide pins 920, 930, 940, the front of the slide tray slot 100 may be in the form of FIG. 11.

FIG. 11 is a front perspective view of a portion of a slide tray slot when the slide tray is normally mounted according to one example embodiment of the present disclosure.

Referring to FIG. 11, a frontal view of the slide tray slot is shown when the slide tray 970 is normally mounted in the slide tray compartment part 950. In one example embodiment, when the slide tray 970 is normally mounted, a region may be formed through which an emitted light source may pass in the direction of the vertical stack in which the plurality of slide tray compartment parts are arranged. In contrast, when the slide tray 970 is not normally mounted, the frontal shape of the slide tray slot may be formed as shown in FIG. 13.

FIG. 12 is a rear perspective view of a portion of a slide tray slot when the slide tray is not normally mounted according to one example embodiment of the present disclosure.

Referring to FIG. 12, the first slot block 520 may include one or more guide pins 1210, 1220, 1230. In one example embodiment, the first slot block 520 may correspond to the first slot block 520 described above with reference to FIG. 5 and the first slot block 520 described above with reference to FIG. 7.

In one example embodiment, when the slide tray 150 is not normally mounted in the slide tray slot 100, the slide tray 150 may not be in contact with at least one of the guide pins 1210, 1220, 1230 because the end regions are not in contact with the guide pins 1210, 1220, 1230. For example, the slide tray 150 may be inserted in contact with the third guidewire 1230, but not in contact with the first guidewire 1210 and the second guidewire 1220.

According to one example embodiment, by positioning the guide pins 1210, 1220, 1230 to correspond with the end regions, if it is not inserted for the end regions not to be contact with the guide pins 1210, 1220, 1230, that is, if the slide tray 150 is not inserted in the reference direction, the area through which the emitted light source may pass in the direction of the vertical stack in which the plurality of slide tray compartment parts are arranged, as will be described later in FIG. 13, may be blocked, preventing the light source from passing.

FIG. 13 is a front perspective view of a portion of a slide tray slot when the slide tray is not normally mounted according to one example embodiment of the present disclosure.

Referring to FIG. 13, if the slide tray 150 is not normally mounted in the slide tray compartment part 1330, a light source emitted in the direction of the vertical stack in which the plurality of slide tray compartment parts are arranged may be blocked from reaching the light source detection sensor due to the slide tray 150 protruding above the reference point.

In one example embodiment, when the slide tray is normally mounted in the slide tray compartment part 1330, the edges of the slide tray may be in contact with the fiducials 1310, 1320. However, if the insertion direction of the slide tray 150 is not inserted in the reference direction, the slide tray may protrude beyond the reference point by hooking at least one of the guide pins, as described above with reference to FIG. 12.

According to one example embodiment, by disposing guide pins corresponding to the shape of the end region, it is easy to determine whether the slide tray is normally mounted.

FIG. 14 is a diagram illustrating an apparatus provided in the ceiling part of a slide tray slot according to one example embodiment of the present disclosure.

FIG. 15 is a diagram illustrating an apparatus provided on a support part of a slide tray slot according to one example embodiment of the present disclosure.

Referring to FIGS. 14 and 15, the slide tray slot 100 may include an apparatus 120 provided in the ceiling part 160 and an apparatus 130 provided in the support part 170. The apparatus 120 in the ceiling part 160 and the apparatus 130 in the support part 170 may be a light source generating apparatus or a light source detection sensor. In one example embodiment, when all of the slides in the plurality of slide tray compartment parts are normally mounted, the light source generating apparatus provided in the ceiling part may emit a light source, and the light source detection sensor provided in the support part may detect the emitted light source. Alternatively, the light source generating apparatus in the support part may emit a light source and the light source detection sensor in the ceiling part may detect the emitted light source.

According to one example embodiment, when the slide trays are all normally mounted in the slide tray slot 100, the light source emitted by the slide tray is not blocked, so the light source detection sensor may detect the light source, and accordingly, the processor may identify that all the slide trays are normally seated.

FIG. 16 is a diagram illustrating an apparatus provided on a support part of a slide tray slot according to one example embodiment of the present disclosure.

Referring to FIG. 16, a slide tray slot 100 is shown as viewed from the ceiling part toward support part 170. In one example embodiment, the apparatus 130 provided on the support part 170 may include a light generating apparatus or a light detection sensor. When all slide trays are normally mounted in the slide tray slot 100, the light source emitted by the light generating apparatus may reach the light detection sensor without any obstacles. In contrast, if either slide tray is not normally mounted, it will cover at least a portion of the light detection sensor, preventing the light emitted by the light generator from reaching the light detection sensor.

Throughout this disclosure, it has been described as being possible to identify that a plurality of slide trays are normally mounted in a slide tray slot when light emitted from a light generating apparatus provided in the ceiling part or the support part is detected by a light detection sensor provided in the support part or the ceiling part, but this is merely an example, and it is also possible to identify that a plurality of slide trays are normally mounted in a slide tray slot based on whether it is possible to reach unobstructedly from the ceiling part to the support part or from the support part to the ceiling part using a signal or physical apparatus other than a light source.

FIG. 17 is a diagram illustrating a slide tray with slides stored therein according to one example embodiment of the present disclosure.

Referring to FIG. 17, a slide tray 150 is shown with slides 1740, 1750, 1760 stored in a plurality of slide holding part. The slide tray 150 may correspond to the slide tray 150 described above with reference to FIG. 4. In one example embodiment, the slides 1740, 1750, 1760 may each be stored in a corresponding slide holding part. The slide holding part may have a width (length along the x-axis) and a height (length along the z-axis) of the grooves that correspond to the width (length along the x-axis) and thickness (length along the z-axis) of the slide to normally store the slide 1740, 1750, 1760. However, the length into the y-axis of the groove corresponding to the slide holding part may be formed so that at least a portion of it is longer than the longitudinal length of the slide (length into the y-axis). Accordingly, a user of the slide tray 150 may easily lift the slide 1740, 1750, 1760 from the slide holding part using the gaps 1710, 1720, 1730 between the slide holding part and the slides. For example, the user may insert a portion of a finger into the gap 1710, 1720, 1730 between the slide holding part and the slide to lift the slide 1740, 1750, 1760.

In one example embodiment, slide 1740 may include specimen information 1770 generated using at least one of numbers, letters, quick response codes (QR codes), and barcodes. Further, the specimen information may correspond to at least one of a subject's name, gender, age, medical history, and information about the specimen.

In one example embodiment, the specimen information 1770 may be used when the slide tray 150 is transported to, and scanned by, a slide scanner. For example, the slide scanner may scan the specimen included in the slide 1740 and simultaneously scan the specimen information 1770 included in the slide 1740 to identify which specimen belongs to which subject, and map the scanned specimen to the specimen information 1770 and store it. Furthermore, if the specimen information 1770 includes a subject's medical history, the slide scanner may map the specimen information 1770, including the subject's medical history, to the scanned specimen to help a person performing a pathology diagnosis make a more accurate pathology diagnosis.

FIG. 18 is a block diagram of a slide tray slot according to one example embodiment of the present disclosure.

Referring to FIG. 18, the slide tray slot 100 may include a transceiver 1810, an input apparatus 1820, a display 1830, a memory 1840, a sensor module 1850, and a processor 1860. However, not all of the components illustrated in FIG. 18 are required components of the slide tray slot 100. The slide tray slot 100 may be implemented by more components than the components shown in FIG. 18, or the slide tray slot 100 may be implemented by fewer components than the components shown in FIG. 18. For example, the slide tray slot 100 may further include a speaker (not shown). Additionally, the transceiver 1810, input apparatus 1820, display 1830, memory 1840, sensor module 1850, and processor 1860 may be implemented on a single chip.

In one example embodiment, the transceiver 1810 may communicate with a terminal or other electronic apparatus that is wired or wirelessly connected to the slide tray slot 100. For example, the slide tray slot 100 may transmit information to a digital scanner indicating that the slide trays are all normally mounted.

The input apparatus 1820 may include a touch panel, a key pad, an ultrasonic input device, a pen sensor, or the like. For example, input apparatus 1820 may include a user input button for emitting a light source from a light source generating apparatus. The slide tray slot 100 may obtain a user input to emit a light source from a user after a slide tray is inserted into the slide tray slot 100.

The display 1830 may include a panel, a holographic apparatus, a projector, or the like. The slide tray slots 100 may output information to the display 1830 regarding whether a slide tray is normally mounted in the plurality of slide tray compartment parts. In addition, the display 1830 may output information indicating that a slide tray is normally mounted in the plurality of slide tray compartment parts if a light source is detected by the light source detection sensor, information indicating that a slide tray is not normally mounted in the plurality of slide tray compartment parts if a light source is not detected by the light source detection sensor after a light source is emitted by the light source generator, and information about the location of the slide tray compartment part that is not normally mounted in the slide tray slot.

Various kinds of data, such as programs and files, such as applications, may be installed and stored in memory 1840. Processor 1860 may access and utilize data stored in memory 1840, or may store new data in memory 1840. In one example embodiment, memory 1840 may include a database.

The sensor module 1850 may, for example, measure a physical quantity or detect an operational state of the slide tray slot 100 and convert the measured or detected information into an electrical signal. For example, sensor module 1850 may include a light sensor, radio frequency identification (RFID) sensor, gesture sensor, gyro sensor, temperature sensor, humidity sensor, weight sensing sensor, barometric pressure sensor, acceleration sensor, proximity sensor, infrared sensor, or the like. The sensor module 1850 may further include control circuitry for controlling the at least one sensor. In one example embodiment, the slide tray slot 100 may detect emitted light using a light sensor.

The processor 1860 controls the overall operation of the slide tray slot 100, and may include at least one processor, such as a CPU, graphic processing unit (GPU), or the like. The processor 1860 may control other configurations included in the slide tray slot 100 to perform operations to operate the slide tray slot 100. For example, the processor 1860 may execute a program stored in the memory 1840, read a stored file, or store a new file. In one example embodiment, the processor 1860 may execute a program stored in the memory 1840 to perform operations to operate the slide tray slot 100. For example, the processor may utilize a light source generator to emit a light source in the direction of the vertical stack in which the plurality of slide tray compartment parts are arranged, and a light source detection sensor to determine whether the light source is detected passing through the plurality of slide tray compartment parts.

In one example embodiment, the slide tray may include a transparent region through which the light source may pass. When the slide tray is normally mounted in the slide tray slot, a portion of the area of the slide tray that is reached by the light emitted by the light source emitting apparatus may be formed as a transparent area, and the remainder may be formed as an opaque area. Accordingly, when the slide tray is normally mounted in the slide tray slot, the light source emitted by the light source generator may pass through the transparent area and reach the light source detection apparatus. In contrast, if the slide tray is inserted into the slide tray slot in the opposite direction, the emitted light is blocked by the opaque area and may not reach the light source detection apparatus.

Further, in one example embodiment, one surface of the slide tray may include a light reflective region. After a light source is emitted by the light source generator, if the light source is not detected by the light source detection sensor, the processor 1860 may determine a distance from the light source generator to the one surface of the slide tray based on the light source reflected by the light reflective area. For example, a distance from the light source generator to one surface of the slide tray may be calculated using the difference between the time of light source emission and the arrival time of the reflected light source. Further, based on the determined distance, the processor 1860 may identify a location of the slide tray compartment part or a location of the slide tray that is not normally mounted in the slide tray slot. Further, the processor 1860 may output information on a slide tray compartment part or location of a slide tray that is not normally mounted in a slide tray slot. For example, the processor 1860 may output information about a slide tray compartment part or location of a slide tray that is not normally mounted in a tray slot on the display 1830, or may output a voice about information on a slide tray compartment part or location of a slide tray that is not normally mounted in a tray slot using the speaker.

The foregoing description of the present disclosure is for illustrative purposes merely, and a person having ordinary skill in the technical field to which the present disclosure belongs will understand that it may be readily adapted to other specific forms without changing the technical idea or essential features of the disclosure. It should therefore be understood that the example embodiments described above are exemplary and non-limiting in all respects. For example, each component described in a single form may also be implemented in a distributed form, and similarly, components described as distributed may also be implemented in a combined form.

The scope of this disclosure is indicated by the following patent claims, rather than by the detailed description above, and shall be construed to include the meaning and scope of the claims and all modifications or variations derived from the equivalents thereof.

What is claimed is:

1. A slide tray slot, comprising:

a slot body;

a light source generator provided on one inner surface of the slot body;

a light source detection sensor capable of detecting a light source emitted from the light source generator; and a plurality of slide tray compartment parts arranged in a vertical stack between the light source generator and the light source detection sensor, wherein the light source generator emits the light source in a direction of the vertical stack in which the plurality of slide tray compartment parts are arranged, wherein a slide tray stored in the plurality of slide tray compartment parts comprises a planar member comprising a plurality of slide holding parts, and wherein the plurality of slide holding parts are formed as grooves for storing slides.

2. The slide tray slot of claim 1, wherein each of the plurality of slide tray compartment part comprises a region through which light emitted from the light source generator can pass when a slide tray is normally mounted in the slide tray slot.

3. The slide tray slot of claim 1, further comprising, at least one guide pin disposed in each of the plurality of slide tray compartment parts to provide a region through which the light source can pass.

4. The slide tray slot of claim 1, wherein a slide tray stored in each of the plurality of slide tray compartment parts comprises a transparent area through which light source emitted from the light source generator can pass when the slide tray is normally mounted.

5. The slide tray slot of claim 1, further comprising at least one processor configured to:

identify whether the light source is detected by the light source detection sensor, and display information on whether the slide tray is normally mounted in the plurality of slide tray compartment parts, based on whether the light source is detected.

6. The slide tray slot of claim 5, wherein the at least one processor is configured to display information indicating that a slide tray is normally mounted in the corresponding to slide tray compartment parts when the light source is detected by the light source detection sensor.

7. The slide tray slot of claim 5, wherein the at least one processor is configured to display information indicating that a slide tray is not normally mounted in the plurality of slide tray compartment parts when the light source is not detected by the light source detection sensor after the light source is emitted by the light source generator.

8. The slide tray slot of claim 5, wherein one surface of the slide tray comprises a light reflective area, and wherein, when the light source is not detected by the light source detection sensor after the light source is emitted by the light source generator, the at least one processor is configured to:

determine, based on light source reflected by the light reflective area, a distance from the light source generator to the one surface of the slide tray, identify, based on the determined distance, a location of a slide tray compartment part that is not normally mounted in the slide tray slot, and display information on the location of the slide tray compartment part not normally mounted in the slide tray slot.

9. The slide tray slot of claim 1, wherein the light source comprises a laser.

10. The slide tray slot of claim 1, wherein a film having an adsorbent property is affixed to the plurality of slide holding parts at least in part.

11. A method of operating a slide tray slot, the method comprising:

emitting a light source in a direction of a vertical stack of a plurality of slide tray compartment parts arranged therein by using a light source generator; and determining whether the light source is detected passing through the plurality of slide tray compartment parts by using a light source detection sensor, wherein the plurality of slide tray compartment parts are arranged in a vertical stack between the light source generator and the light source detection sensor, wherein a slide tray stored in the plurality of slide tray compartment parts comprises a planar member comprising a plurality of slide holding parts, and wherein the plurality of slide holding parts are formed as grooves for storing slides.

12. The method of claim 11, wherein each of the plurality of slide tray compartment parts comprises a region through which light emitted from the light source generator can pass when a slide tray is normally mounted in the slide tray slot.

13. The method of claim 11, wherein each of the plurality of slide tray compartment parts can be provided with at least one guide pin to provide a region through which the light source can pass.

14. The method of claim 11, wherein a slide tray stored in each of the plurality of slide tray compartment parts comprises a transparent area through which light source emitted from the light source generator can pass when the slide tray is normally mounted.

15. The method of claim 11, further comprising:

based on determining whether the light source is detected passing through the plurality of slide tray compartment parts, displaying information on whether the slide tray is normally mounted in the plurality of slide tray compartment parts.

16. The method of claim 15, wherein the displaying information on whether the slide tray is normally mounted in the plurality of slide tray compartment parts comprises:

displaying information indicating that a slide tray is normally mounted in the plurality of slide tray compartment parts if the light source is detected by the light source detection sensor after the light source is emitted by the light source generator.

17. The method of claim 15, wherein the displaying information on whether the slide tray is normally mounted in the plurality of slide tray compartment parts comprises:

displaying information indicating that a slide tray is not normally mounted in the plurality of slide tray compartment parts if the light source is not detected by the light source detection sensor after the light source is emitted by the light source generator.

18. The method of claim 15, wherein the displaying information on whether the slide tray is normally mounted in the plurality of slide tray compartment parts comprises:

determining a distance from the light source generator to a bottom surface of the slide tray based on a light source reflected by a light reflective region of a bottom surface of the slide tray, if the light source is not detected by the light source detection sensor after the light source is emitted by the light source generator;

identifying, based on the determined distance, a location of a slide tray compartment part that is not normally mounted in the slide tray slot; and displaying information on the location of the slide tray compartment part that is not normally mounted in the slide tray slot.

19. The method of claim 11, wherein the light source comprises a laser.

20. The method of claim 11, wherein a film having an adsorbent property is affixed to the plurality of slide holding parts at least in part.

* * * * *